(12) United States Patent
Tsutsumi et al.

(10) Patent No.: US 10,356,170 B2
(45) Date of Patent: *Jul. 16, 2019

(54) NETWORK SYSTEM AND CONTROL METHOD OF A NETWORK SYSTEM, AND A CONTROL DEVICE

(71) Applicant: Seiko Epson Corporation, Tokyo (JP)

(72) Inventors: Koichiro Tsutsumi, London (GB); Junichi Yoshizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 15/140,030

(22) Filed: Apr. 27, 2016

(65) Prior Publication Data
US 2016/0323380 A1     Nov. 3, 2016

(30) Foreign Application Priority Data

Apr. 30, 2015    (JP) ................................. 2015-092863

(51) Int. Cl.
*G06Q 20/20* (2012.01)
*H04L 29/08* (2006.01)

(52) U.S. Cl.
CPC ....... *H04L 67/1095* (2013.01); *G06Q 20/202* (2013.01); *H04L 67/2861* (2013.01)

(58) Field of Classification Search
CPC .......... H04L 67/1095; H04L 29/12509; G06Q 30/06; G06Q 20/20; G06Q 20/16; G06Q 20/34
USPC ............. 709/219, 224, 228, 229; 705/21, 75
See application file for complete search history.

(56) References Cited

U.S. PATENT DOCUMENTS

| | | | |
|---|---|---|---|
| 6,311,165 B1* | 10/2001 | Coutts ................ | G06Q 20/1085 235/379 |
| 6,792,558 B2 | 9/2004 | Kuwako et al. | |
| 7,349,884 B1* | 3/2008 | Odom .................. | G06Q 20/042 705/40 |
| 7,487,202 B2 | 2/2009 | Machida | |

(Continued)

FOREIGN PATENT DOCUMENTS

| | | |
|---|---|---|
| JP | 04-114250 A | 4/1992 |
| JP | 09-091541 A | 4/1997 |

(Continued)

OTHER PUBLICATIONS

Bernstein PA. Transaction processing monitors. Communications of the ACM. Nov. 1, 1990;33(11):75-86.*

(Continued)

*Primary Examiner* — Ranodhi Serrao
*Assistant Examiner* — James N Fiorillo
(74) *Attorney, Agent, or Firm* — Workman Nydegger

(57) ABSTRACT

A system having a server and a control device that connects to the server through a global network and executes processes referenced to data stored on the server can handle events in which the control device and server cannot communicate with each other. When a control device-side product master database stored by a POS terminal is updated while the POS terminal is unable to communicate with the control server, the POS terminal communicates with another POS terminal through the local area network LN and causes that other POS terminal to update its locally stored control device-side product master database.

12 Claims, 9 Drawing Sheets

(56) References Cited

U.S. PATENT DOCUMENTS

| | | | |
|---|---|---|---|
| 9,590,976 B2 | 3/2017 | Logue et al. | |
| 2002/0162044 A1 | 10/2002 | Kuwako et al. | |
| 2004/0017580 A1 | 1/2004 | Kuroda | |
| 2004/0267546 A1* | 12/2004 | Yamada | G06Q 20/20 705/21 |
| 2006/0173997 A1* | 8/2006 | Tullberg | H04L 29/12509 709/224 |
| 2008/0246986 A1 | 10/2008 | Scrafford et al. | |
| 2010/0027054 A1* | 2/2010 | Reddy | H04N 1/00233 358/1.15 |
| 2011/0125566 A1* | 5/2011 | McLaughlin | G06Q 20/20 705/14.23 |
| 2013/0204727 A1* | 8/2013 | Rothschild | G06Q 20/20 705/21 |
| 2014/0040014 A1* | 2/2014 | Anand | G06Q 30/06 705/14.45 |
| 2014/0040186 A1* | 2/2014 | Okamura | G06F 17/2735 707/609 |
| 2016/0034876 A1* | 2/2016 | Speiser | G06Q 30/06 705/21 |
| 2016/0379196 A1* | 12/2016 | Kawamori | G06Q 20/202 |
| 2016/0380852 A1* | 12/2016 | Kawamori | G06F 8/61 709/224 |

FOREIGN PATENT DOCUMENTS

| | | |
|---|---|---|
| JP | 09-330474 A | 12/1997 |
| JP | 10-255170 A | 9/1998 |
| JP | 2000-099435 A | 4/2000 |
| JP | 2002-135356 A | 5/2002 |
| JP | 2002-330132 A | 11/2002 |
| JP | 2004-139425 A | 5/2004 |
| JP | 2005-258572 A | 9/2005 |
| JP | 2009-009174 A | 1/2009 |
| JP | 2010-026609 A | 2/2010 |
| JP | 2010-124349 A | 6/2010 |
| JP | 2014-149602 A | 8/2014 |

OTHER PUBLICATIONS

Bernstein PA. Transaction processing monitors. Communications of the ACM. Nov 1, 1990;33(11):75-86. (Year: 1990).*

* cited by examiner

NETWORK SYSTEM AND CONTROL METHOD OF A NETWORK SYSTEM, AND A CONTROL DEVICE

This application claims priority under 35 U.S.C. § 119 to Japanese Patent Application No. 2015-92863 filed on Apr. 30, 2015, the entire disclosure of which is expressly incorporated by reference herein.

BACKGROUND

1. Technical Field

The present invention relates to a network system and a control method of a network system, and a control device.

2. Related Art

POS systems in which a control device (POS terminal) references specific data while executing transaction-related processes are known from the literature. See, for example, JP-A-2009-9174. More recently, cloud systems in which a server (a cloud server) connected to a global network such as the Internet executes a process in response to a request from a client have become common.

A benefit of a configuration in which a server stores specific data and a control device, which is a client of the server, references the specific data stored by the server to execute processes by applying the technology of JP-A-2009-9174 is that control devices connected to the global network can be managed by the server. A problem is that being able to continue executing processes when the control device cannot communicate with the server is also necessary.

SUMMARY

The present invention is directed to a system including a server, a control device that connects to the server through a global network, and the system is configured so that the control device executes processes referenced to data stored on the server, and can handle events in which the control device and server cannot communicate with each other.

A network system according to the invention includes a server configured to connect to a global network; and a plurality of control devices configured to communicate through the global network with the server and with each other through a local area network. Each control device: when able to communicate with the server, communicates with the server through the global network and executes a specific process using server-side data stored by the server; when unable to communicate with the server, executes the specific process using control device-side data that is stored locally by the control device and is synchronized with the server-side data; and when the control device-side data stored by at least one control device is updated while unable to communicate with the server, that one control device communicates with the other control devices through the local area network, and causes each other control device to update the control device-side data stored by that other control device.

Thus comprised, a system having a server and a control device that connects to the server through a global network and executes processes referenced to data stored on the server can handle events in which the control device and server cannot communicate with each other.

In a network system according to another aspect of the invention, the server-side data and control device-side data are master data used in a transaction process; and the control devices use the server-side data or the control device-side data to execute the transaction process.

Thus comprised, plural control devices connected to a local area network can be prevented from using master data of different content and executing different transaction processes.

In a network system according to another aspect of the invention, the control device has a recording function to record transaction information on a recording medium, and records the transaction information using the server-side data or the control device-side data.

Thus comprised, plural control devices connected to a local area network can be prevented from using master data of different content and printing receipts recorded with different transaction information.

A network system according to another aspect of the invention preferably also has a recording device configured to record transaction information on a recording medium. The control device can connect to the recording device, and cause the recording device to record the transaction information using the server-side data or the control device-side data.

Thus comprised, plural recording devices connected to a local area network can be prevented from using master data of different content and printing receipts recorded with different transaction information.

In a network system according to another aspect of the invention, when one control device causes another control device to update the control device-side data stored by that other control device, the one control device reports when the other control device does not successfully update the control device-side data.

Thus comprised, the user can know which control devices were unable to successfully update the control device-side data, and thereby can be prevented from using control device-side data of different content and different transaction processes being executed.

Another aspect of the invention is a control method of a network system including a server configured to connect to a global network, and a plurality of control devices configured to communicate through the global network with the server and with each other through a local area network. The control method includes steps of the control devices: when able to communicate with the server, communicating with the server through the global network and executing a specific process using server-side data stored by the server; when unable to communicate with the server, executing the specific process using control device-side data that is stored locally by the control device and is synchronized with the server-side data; and when the control device-side data stored by at least one control device is updated while unable to communicate with the server, that one control device communicates with the other control devices through the local area network, and causes each other control device to update the control device-side data stored by that other control device.

Thus comprised, a system having a server and a control device that connects to the server through a global network and executes processes referenced to data stored on the server can handle events in which the control device and server cannot communicate with each other.

Another aspect of the invention is a control device including: a communication unit configured to communicate with a server through a global network and with another control device through a local area network, and communicate with the server through the global network to receive control device-side data synchronized with server-side data stored by the server; a storage unit configured to store the received control device-side data; and a control unit. The control unit is configured to communicate by the communication unit with the server through the global network and execute a process using the server-side data when able to communicate with the server; execute the specific process using control device-side data that is stored in the storage unit when unable to communicate with the server; and when the control device-side data stored by the storage unit is updated while unable to communicate with the server, communicate by the communication unit with another control device through the local area network, and cause the other control device to update the control device-side data stored by the other control device.

Thus comprised, a system having a server and a control device that connects to the server through a global network and executes processes referenced to data stored on the server can handle events in which the control device and server cannot communicate with each other.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
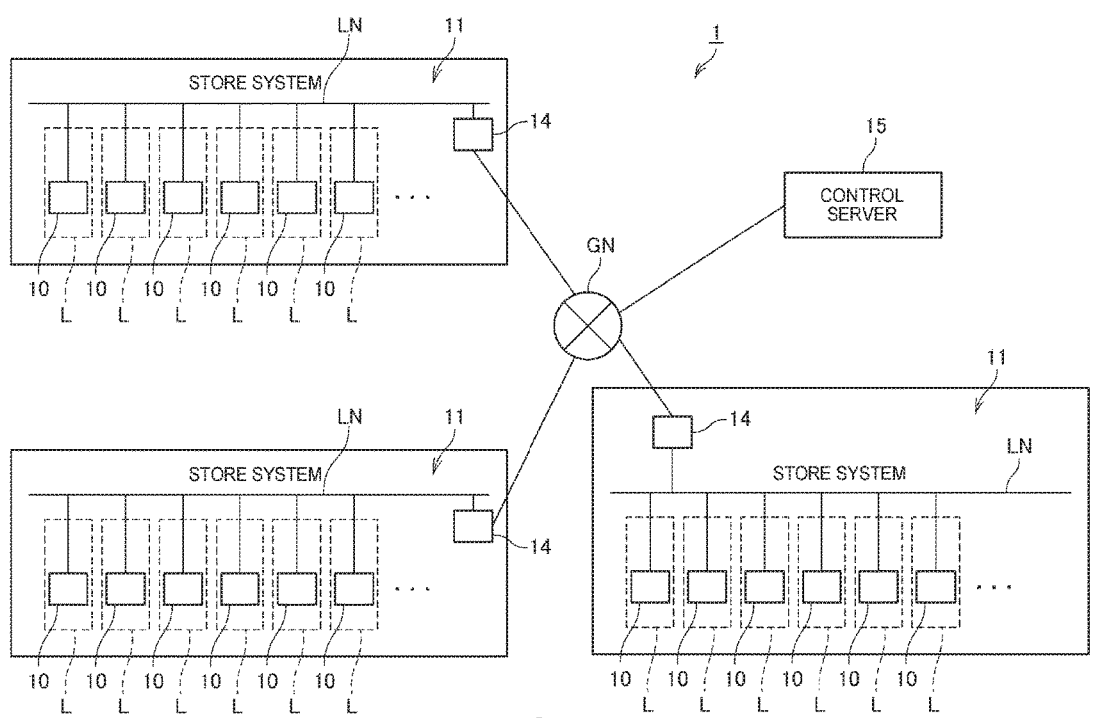
FIG. 1 illustrates the configuration of a network system related to a preferred embodiment of the invention.

FIG. 1 shows the configuration of a transaction processing system 1 (network system) according to a preferred embodiment of the invention.

As shown in FIG. 1, the transaction processing system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

A checkout counter L where customer transactions are processed is located in the business where the store system 11 is deployed. A POS terminal 10 (control device) that can produce receipts appropriate to the transaction is installed at each checkout counter L.

The POS terminal 10 has functions for executing a transaction process appropriate to the transaction performed at the checkout counter L, and producing receipts recorded with information related to the transaction. The receipt produced by the POS terminal 10 is then given to the customer.

The configuration and functions of the POS terminal 10, and processes based on the functions of the POS terminal 10, are described further below.

The store system 11 also has a local area network LN.

The POS terminal 10 connects to the local area network LN according to a communication protocol appropriate to the LAN. Any suitable communication protocol may be used by the POS terminal 10 to connect to the local area network LN, and a wired or wireless connection may be used.

A communication device 14 is also connected to the local area network LN. The communication device 14 is an interface device that connects the local area network LN to a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The POS terminal 10 can also access the global network GN through the communication device 14.

A control server 15 (server) connects to the global network GN. The control server 15 is a cloud server in a cloud system in which the POS terminal 10 is a client. More specifically, when triggered by a request from a client device, for example, the control server 15 runs a specific operating process and sends data based on the result of the process to the client. Note that the control server 15 is represented by a single function block in FIG. 1, but this does not mean that the control server 15 is embodied by a single server device. For example, the control server 15 may include a plurality of server devices. More specifically, the control server 15 may be any configuration that can execute the processes described below.

Figure 2:
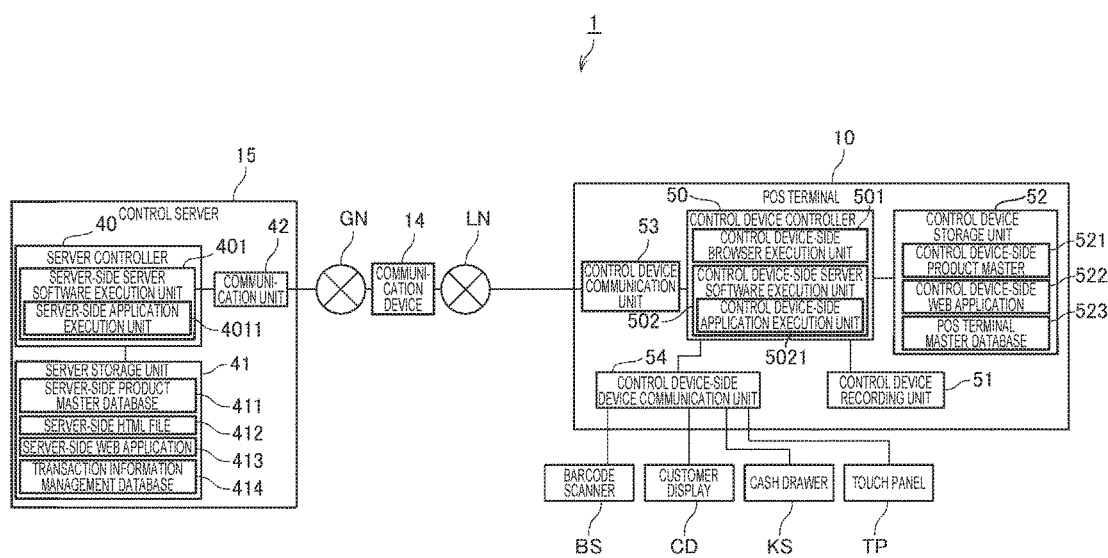
FIG. 2 is a block diagram illustrating the functional configuration of devices in the network system.

FIG. 2 is a block diagram illustrating the functional configuration of the POS terminal 10 and control server 15 in the transaction processing system 1.

The POS terminal 10 is a thermal line printer that stores roll paper (recording medium) and records images by forming dots with a thermal line head on the roll paper.

As shown in FIG. 2, the POS terminal 10 has a control device controller 50 (control unit), a control device recording unit 51, a control device storage unit 52, a control device communication unit 53 (communication unit), and a control device-side device communication unit 54.

The control device controller 50 has a CPU, ROM, RAM, and other peripheral circuits not shown, and controls the POS terminal 10.

The control device recording unit 51 includes mechanisms related to recording on roll paper, such as a conveyance mechanism for conveying roll paper stored inside the cabinet of the POS terminal 10, a recording mechanism for forming dots and recording images on the roll paper with a thermal head, and a cutter mechanism for cutting the roll paper at a specific position. The control device recording unit 51 conveys the roll paper with the conveyance mechanism, records receipt-related images on the roll paper with the recording mechanism, and cuts the roll paper at a specific position with the cutter mechanism as controlled by the control device controller 50 to produce a receipt.

The control device storage unit 52 has nonvolatile memory such as an EPROM device, and stores data.

The control device storage unit 52 stores a control device-side product master database 521 (control device-side data), which is a product master database relationally storing the product code of a product to other information related to that product. The information related to the product includes at least the price of the product.

The control device storage unit 52 also stores a control device-side web application 522. The control device-side web application 522 is described further below.

The control device storage unit 52 also stores a POS terminal master database 523. The POS terminal master database 523 is described further below.

A specific web browser is installed on the POS terminal 10. The control device controller 50 functions as a control device-side browser execution unit 501 by reading and running the installed web browser.

Specific web server software is also installed on the POS terminal 10. The control device controller 50 also functions as a control device-side server software execution unit 502 by reading and running the installed web server software.

The control device-side web application 522 is a software application that is run by the specific web server software application installed on the POS terminal 10, and communicates with the specific web server application by interprocess communication.

The control device-side server software execution unit 502 also functions as a control device-side application execution unit 5021 by reading and running the control device-side web application 522.

In relation to the control device-side browser execution unit 501, the control device-side server software execution unit 502 functions as a server of which the control device-side browser execution unit 501 is a client.

The functions of the function blocks of the control device controller 50, and processes based on those functions, are described further below.

The control device communication unit 53 accesses the local area network LN and communicates with devices (including other POS terminals 10) connected to the network as controlled by the control device controller 50.

The control device communication unit 53 also accesses the global network GN and communicates with devices connected to the network (including the control server 15) through the communication device 14 as controlled by the control device controller 50.

The control device-side device communication unit 54 has an interface board with a USB port, a port conforming to a non-USB serial communication standard, or ports conforming to other communication protocols. Devices can connect to each port. The control device-side device communication unit 54 communicates with devices connected to the POS terminal 10 through the corresponding port as controlled by the control device controller 50.

Note that the control device-side device communication unit 54 may also be configured with a wireless communication capability and communicate with devices wirelessly.

A barcode scanner BS, customer display CD, cash drawer KS, and touch panel TP are devices connected to the POS terminal 10.

The barcode scanner BS is used to read barcodes from products and product packaging, and outputs data representing the barcode to the control device-side device communication unit 54. The control device-side device communication unit 54 then outputs the data input from the barcode scanner BS to the control device controller 50.

The customer display CD displays images as controlled by the control device controller 50. The information presented on the customer display CD can be read by the customer involved in the transaction at the checkout counter L.

The cash drawer KS has a tray for storing cash, and a mechanism for locking the tray, and unlocks and opens the tray as controlled by the control device controller 50.

The touch panel TP has a display device such as an LCD panel or OLED panel, and a touch sensor disposed over the display device for detecting touch operations by the user (including the checkout clerk). The touch panel TP is disposed to a position at the checkout counter L where it can be read by the checkout clerk and operated by touch. The touch panel TP displays images on the display device as controlled by the control device controller 50. The control device-side browser execution unit 501 of the control device controller 50 can display a web page on the touch panel TP based on an HTML file acquired by a specific means. When a touch operation by the user is detected, the touch panel TP outputs a signal indicating the touched position to the control device controller 50.

Based on input from the touch panel TP, the control device controller 50 executes a process corresponding to the touch operation of the user.

As shown in FIG. 2, the control server 15 has a server controller 40, server storage unit 41, and server communication unit 42.

The server controller 40 includes a CPU, ROM, RAM, and other peripheral circuits, and controls the control server 15.

The server storage unit 41 has nonvolatile memory such as a hard disk drive or EEPROM device not shown, and stores data.

The server storage unit 41 stores a server-side product master database 411 (server-side data) relationally storing a product code for each product and the product price.

The server storage unit 41 stores a server-side HTML file 412, which is an HTML file. The server-side HTML file 412 is described further below.

The server storage unit 41 stores a server-side web application 413. The server-side web application 413 is described further below.

The server storage unit 41 also stores a transaction information management database 414. The transaction information management database 414 is described further below.

Specific web server software is installed on the control server 15. The server controller 40 functions as a server-side server software execution unit 401 by reading and running the installed web server software.

The server-side web application 413 is a software application that is run by the specific web server software installed on the control server 15, and communicates with the specific web server application by interprocess communication.

The server-side server software execution unit 401 also functions as a server-side application execution unit 4011 by reading and running the server-side web application 413.

The server communication unit 42 accesses the global network GN and communicates with devices connected to the network (including the POS terminal 10) as controlled by the server controller 40.

Processing a Transaction when Communication Between the POS Terminal 10 and Control Server 15 is Possible The operation of devices in the transaction processing system 1 during a transaction at the checkout counter L when the POS terminal 10 can communicate with the control server 15 is described next.

Note that being unable to communicate in this embodiment includes when no communication with the control server 15 is possible, when there is a communication delay exceeding a specific timeout period, and when communication is unstable for longer than a specific period.

The checkout clerk working the register at the checkout counter L (or other person) turns the POS terminal 10 installed at the same checkout counter L on at some specific time before the transaction starts. For example, the checkout clerk may turn the power of the POS terminal 10 on before the store where the transaction processing system 1 is installed opens each day.

The POS terminal 10 is configured to automatically start a specific web browser installed on the POS terminal 10 when the power turns on.

When the browser starts, the control device-side browser execution unit 501 of the POS terminal 10 accesses a specific URL on the control server 15, and accesses the control server 15 by HTTP. The URL of the control server 15 and other information required to communicate with the control server 15 is previously registered. When accessed by the POS terminal 10, the server-side server software execution unit 401 of the server controller 40 of the control server 15 sends the server-side HTML file 412 corresponding to the accessed URL to the POS terminal 10. The control device-side browser execution unit 501 of the control device controller 50 of the POS terminal 10 thus acquires the server-side HTML file 412 transmitted by the control server 15.

A program with functions for communicating with the server-side application execution unit 4011 of the server controller 40 of the control server 15 and executing transaction-related processes is embedded in the server-side HTML file 412 in a specific scripting language. The functions of the control device-side browser execution unit 501 of the control device controller 50 of the POS terminal 10 are embodied by programs written in a specific scripting language that runs on the browser, the server-side web application 413 of the control server 15, the control device-side web application 522 of the POS terminal 10, and associated programs.

The control device-side browser execution unit 501 executes the acquired server-side HTML file 412, and displays a user interface for processing transactions 60 (FIG. 3) on the touch panel TP.

Figure 3:
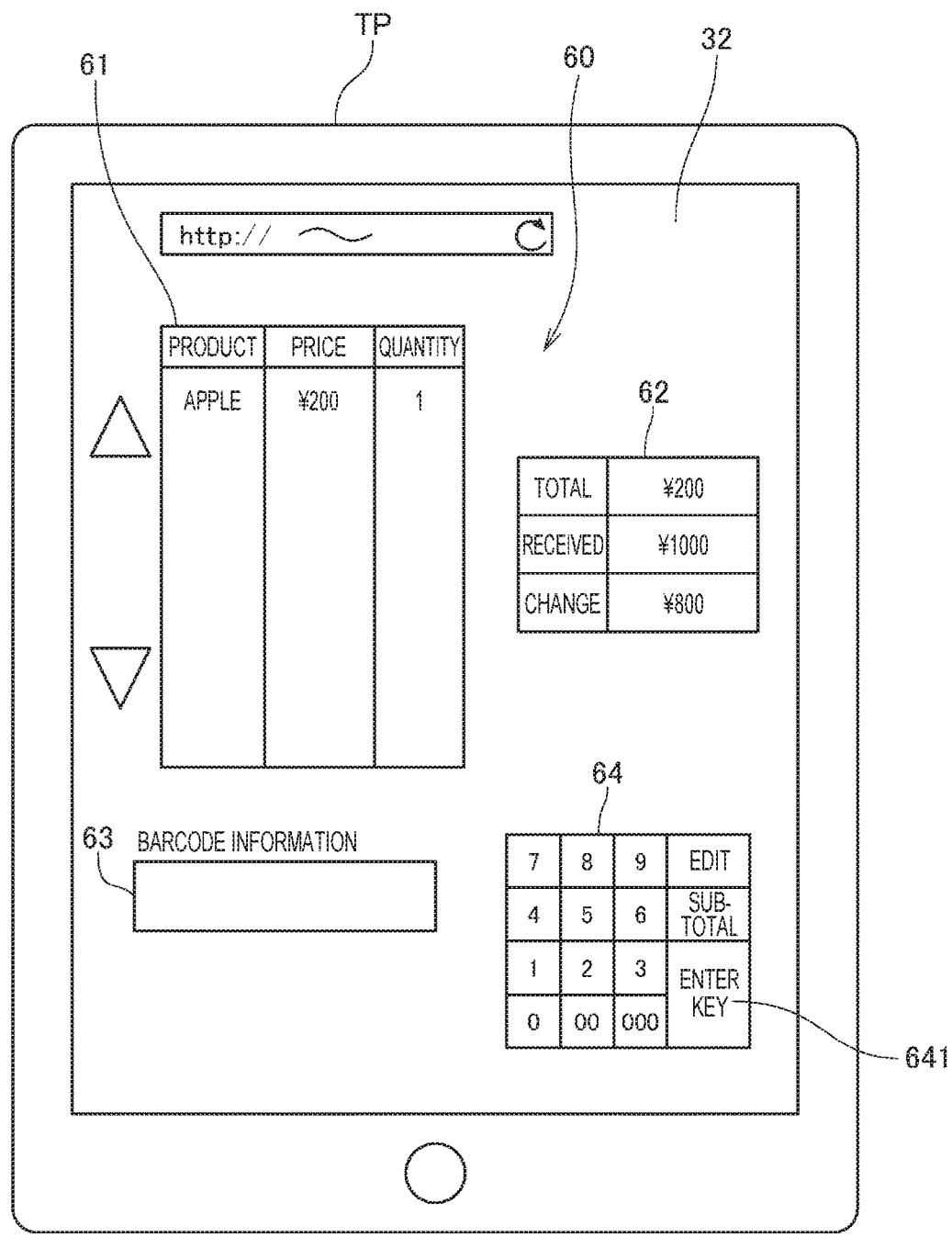
FIG. 3 shows an example of a user interface for a transaction.

FIG. 3 shows an example of a user interface for processing transactions 60 that is displayed on the touch panel TP.

A list display area 61 where the names of the products (product names) being purchased by the customer, the prices of the products, and the quantities of the products are presented in a list is displayed at the top left of the user interface for processing transactions 60 in FIG. 3. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is basically the product code assigned to the product.

A virtual keypad 64 is displayed on the right side of the barcode information display area 63. The virtual keypad 64 includes an Enter key 641 for finalizing the transaction.

Figure 4:
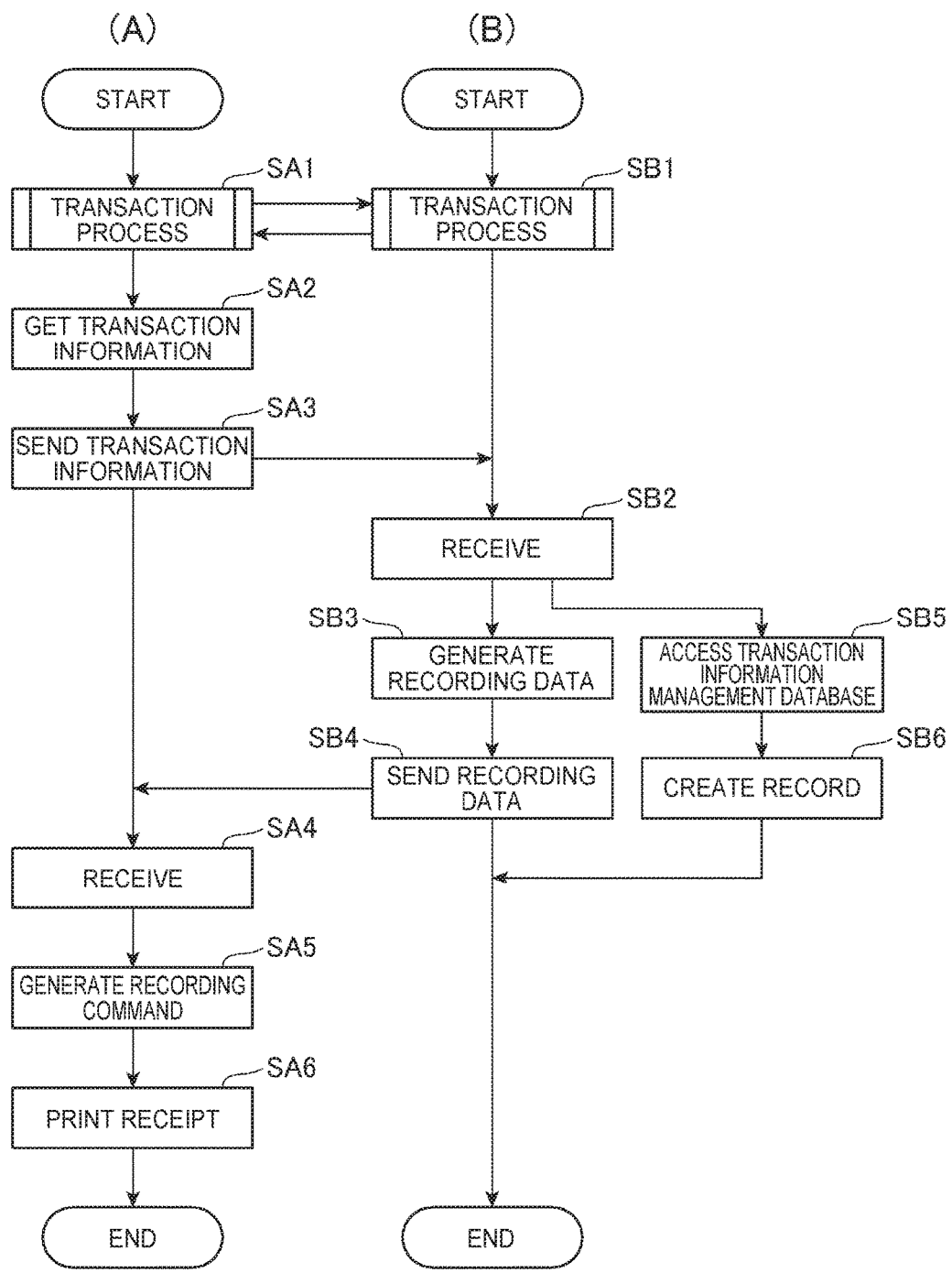
FIG. 4 is a flow chart of the operation of a POS terminal (column (A)) and a control server (column (B)).

FIG. 4 is a flow chart showing the operation of devices in the transaction processing system 1 during a transaction. Column (A) shows the operation of the POS terminal 10, and column (B) shows the operation of the control server 15.

As shown in FIG. 4, the POS terminal 10 and control server 15 start the transaction process when a transaction begins (step SA1 and step SB1).

Figure 5:
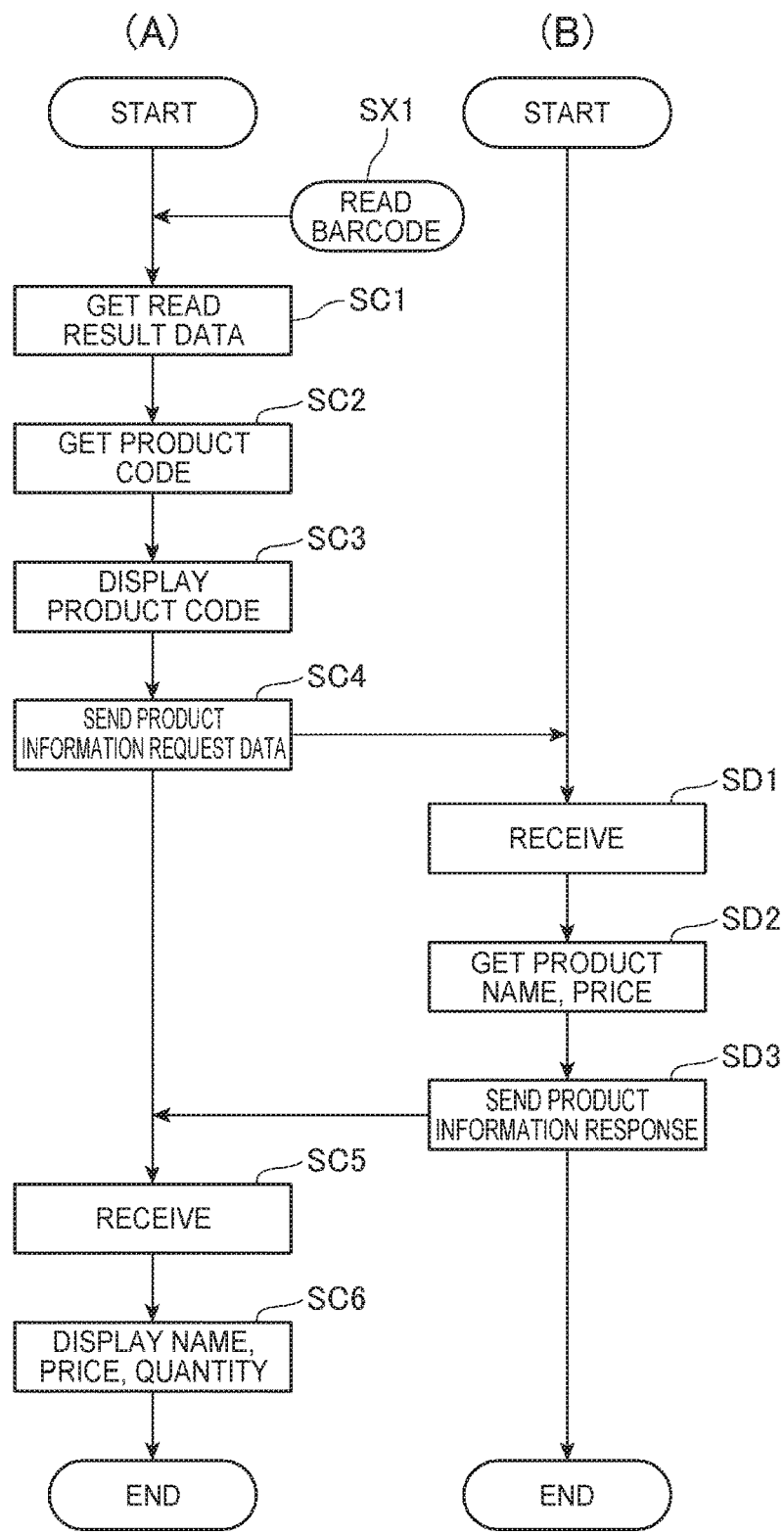
FIG. 5 is a flow chart of the operation of a POS terminal (column (A)) and a control server (column (B)).

FIG. 5 is a flow chart showing part of the process executed by the POS terminal 10 and control server 15 in the transaction process. Column (A) shows the operation of the POS terminal 10, and column (B) shows the operation of the control server 15.

In the transaction process, the checkout clerk reads the barcode on the product or the packaging of the product being purchased by the customer with the barcode scanner BS (step SX1). Upon reading a barcode, the barcode scanner BS sends data based on the read result (referred to below as the "read result data") through the port to which the barcode scanner BS is connected to the control device-side device communication unit 54 of the POS terminal 10. The control device-side device communication unit 54 then outputs the read result data to the control device controller 50.

The read result data is data including information indicating the product code of the product.

As shown in the operation of the POS terminal 10 in column (A) of FIG. 5, the control device-side browser execution unit 501 of the control device controller 50 of the POS terminal 10 acquires the read result data based on the input from the control device-side device communication unit 54 (step SC1).

Next, the control device-side browser execution unit 501 acquires the product code based on the read result data (step SC2).

Next, the control device-side browser execution unit 501 displays the product code acquired in step SC2 in the barcode information display area 63 of the user interface for processing transactions 60 (step SC3).

Next, the control device-side browser execution unit 501 controls the control device communication unit 53 to send the product name for the product code acquired in step SC2 and data querying the price of the product (referred to below as product information request data) to the control server 15 (step SC4).

Note that the control device-side browser execution unit 501 manages the information required to communicate with the control server 15, such as the address of the control server 15 and the corresponding protocol, opens a connection with the control server 15 based on the managed information, and communicates data through the opened connection.

As shown in the operation of the control server 15 in column (B) of FIG. 5, the server-side application execution unit 4011 of the server controller 40 of the control server 15 controls the server communication unit 42 to receive the product information request data (step SD1).

Next, based on the received product information request data, the server-side application execution unit 4011 acquires the product code, references the server-side product master database 411 stored by the server storage unit 41, and acquires the name and the price of the product identified by the acquired product code (step SD2).

Next, the server-side application execution unit 4011 controls the server communication unit 42, and sends product information response data expressing the product name and price information acquired in step SD2 to the POS terminal 10 (step SD3).

As shown in the operation of the POS terminal 10 in column (A) of FIG. 5, the control device-side browser execution unit 501 of the control device controller 50 of the POS terminal 10 controls the control device communication unit 53 to receive the product information response data (step SC5).

Next, the control device-side browser execution unit 501 acquires the product name and product price information based on the received product information response data, and displays the name, price, and quantity of the product in the corresponding fields of the list display area 61 in the user interface for processing transactions 60 (step SC6).

As described above, during a transaction, the checkout clerk reads the barcode with the barcode scanner BS from each product being purchased by the customer, and the POS terminal 10 and control server 15 execute the process shown in the flow chart in FIG. 5 based on the read barcode.

When reading the barcode from every product and processing by each device based on the read barcode is completed, the name, price, and quantity of each product being purchased by the customer is displayed in the list display area 61.

When the barcode of every product has been read, the checkout clerk uses the virtual keypad 64 to confirm the transaction total, receives payment from the customer, and makes change as due. The control device-side browser execution unit 501 of the control device controller 50 of the POS terminal 10 then appropriately displays the total of the products purchased by the customer, the amount received from the customer for the transaction, and the change due to the customer in the amount display area 62 of the user interface for processing transactions 60. The control device-side browser execution unit 501 also controls the customer display CD appropriately to display information related to the transaction on the customer display CD. The control device-side browser execution unit 501 also controls the cash drawer KS appropriately to open the tray of the cash drawer KS.

When change has been given to the customer, the checkout clerk presses the Enter key 641 of the virtual keypad 64 of the user interface for processing transactions 60. The transaction process ends when the checkout clerk operates the Enter key 641.

As shown in the operation of the POS terminal 10 in column (A) of FIG. 4, when the transaction process ends, the control device-side browser execution unit 501 of the control device controller 50 of the POS terminal 10 acquires the transaction information (step SA2).

The transaction information is information including: information denoting the combination of product code, name, price, and quantity for each product purchased by the customer (referred to below as the purchased product information); information denoting the total purchase amount, cash amount received from the customer, and change returned to the customer (referred to below as transaction amount information); information denoting the time of the transaction (referred to below as the transaction time information); and the store ID, which is identification information for the store (business) where the transaction was completed.

Note that during a transaction, the control device-side browser execution unit 501 stores information contained in the purchased product information and information contained in the transaction amount information to specific storage areas. In step SB2, the control device-side browser execution unit 501 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

After acquiring the transaction information, the control device-side browser execution unit 501 controls the control device communication unit 53 to send transaction information data indicating the acquired transaction information to the control server 15 (step SA3).

As shown in the operation of the control server 15 in column (B) of FIG. 4, the server-side application execution unit 4011 of the server controller 40 of the control server 15 controls the server communication unit 42 to receive the transaction information data (step SB2).

Next, the server-side application execution unit 4011 generates recording data for producing a receipt in a specific layout based on the transaction information indicated by the received transaction information data (step SB3).

The recording data is control data specifying producing a receipt according to a specific layout, and including in this example a top logo, bottom logo, the time of the transaction, the name, price, quantity and total amount of the products purchased by the customer, the amount received from the customer, and the amount of change due to the customer. The recording data in this embodiment is an XML document of information written in a specific XML format.

Next, the server-side application execution unit 4011 controls the server communication unit 42 to send the generated recording data to the POS terminal 10 (step SB4).

As shown in the operation of the POS terminal 10 in column (A) of FIG. 4, the control device-side browser execution unit 501 of the control device controller 50 of the POS terminal 10 controls the control device communication unit 53 to receive the recording data (step SA4).

Next, the control device-side browser execution unit 501 generates recording commands in the command language of the control device recording unit 51 based on the recording data in the XML document (step SA5).

Next, the control device-side browser execution unit 501 controls the control device recording unit 51 to produce a receipt based on the generated recording commands (step SA6).

The receipt produced in step SA4 is then given by the checkout clerk to the customer.

As shown in the operation of the control server 15 in column (B) of FIG. 4, after the transaction information data is received in step SB2, the server-side application execution unit 4011 of the server controller 40 of the control server 15 accesses the transaction information management database 414 stored by the server storage unit (step SB5).

Each record in the transaction information management database 414 relationally stores the purchased product information, transaction amount information, transaction time information, and store ID.

Next, based on the transaction information data received in step SB2, a record relating the purchased product information, transaction amount information, transaction time information, and store ID is created in the transaction information management database 414 (step SB6).

The control server 15 thus cumulatively stores transaction information appropriate to the transaction. As a result, the control server 15 can manage sales by store and sales by individual product in each store.

Transaction Processing when the POS Terminal 10 Cannot Communicate with the Control Server 15

Operation of the POS terminal 10 during a transaction at the checkout counter L when the POS terminal 10 cannot communicate with the control server 15 is described next. As described above, communication being not possible in this embodiment includes when no communication with the control server 15 is possible, when there is a communication delay exceeding a specific timeout period, and when communication is unstable for longer than a specific period.

Figure 6:
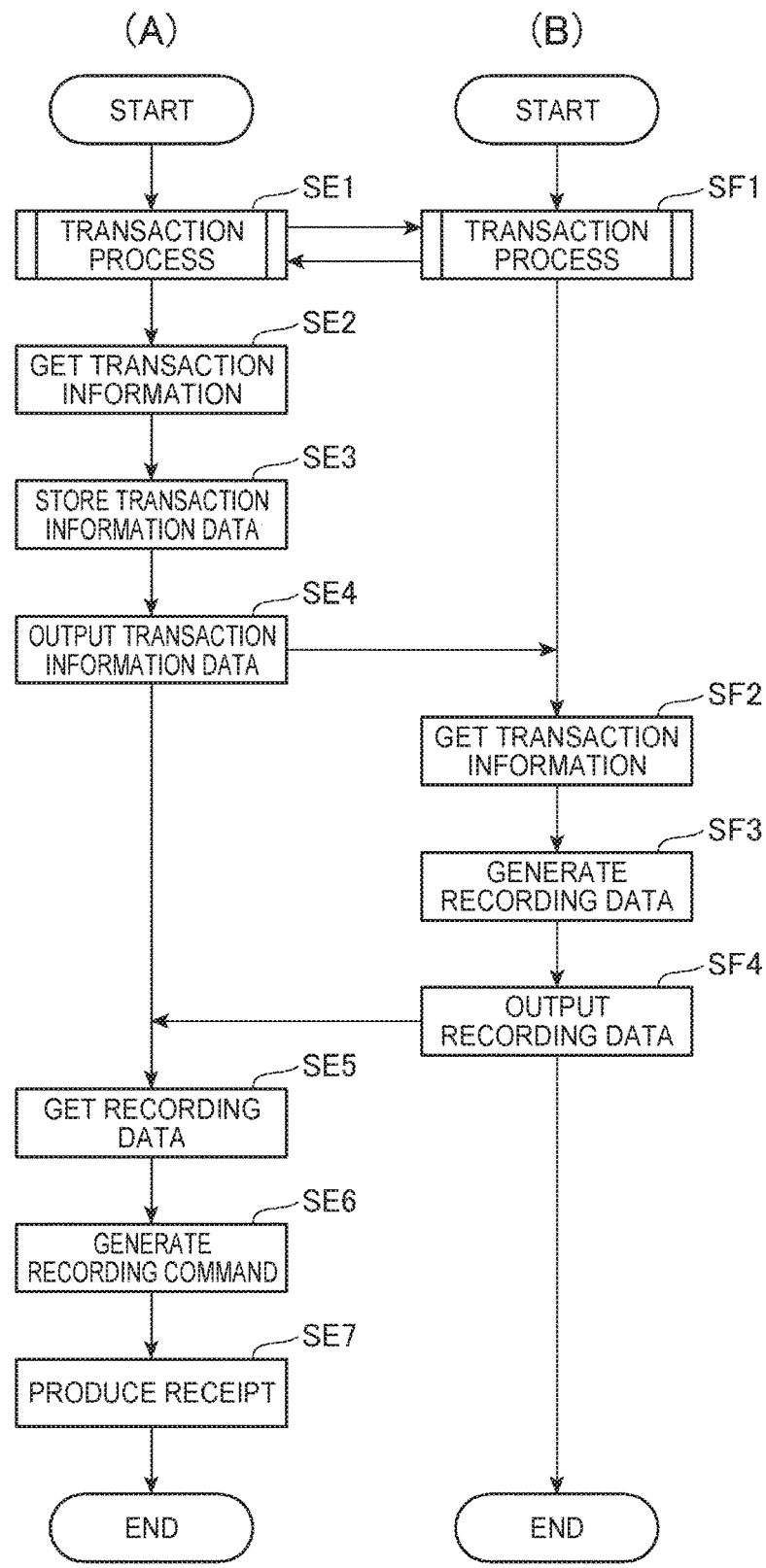
FIG. 6 is a flow chart of the operation of the control device-side browser execution unit 501 (column (A)) and the control device-side server software execution unit 502 (column (B)) of the POS terminal.

FIG. 6 is a flow chart showing the operation of the POS terminal 10 when communication with the control server 15 is not possible, column (A) showing the operation of the control device-side browser execution unit 501, and column (B) showing the operation of the control device-side server software execution unit 502 (including the control device-side application execution unit 5021).

When the process shown in the flow chart in FIG. 6 starts, acquisition of the server-side HTML file 412 by the control device-side browser execution unit 501 of the POS terminal 10 has completed. More specifically, the process of the flow chart shown in FIG. 6 is based on the POS terminal 10 not being able to communicate with the control server 15 for some reason after the control device-side browser execution unit 501 has acquired the server-side HTML file 412.

Note that a configuration that stores a HTML file synchronized by some means with the server-side HTML file 412 in the POS terminal 10, and retrieves the stored HTML file when the control device-side browser execution unit 501 cannot acquire the server-side HTML file 412 from the control server 15 because the control device-side browser execution unit 501 cannot communicate with the control server 15 is also conceivable.

The control device-side browser execution unit 501 executes the process shown in the flowchart in column (A) of FIG. 6 of the operation of the control device-side browser execution unit 501 of the POS terminal 10 when it determines before the transaction process starts in step SE1 that communication with the control server 15 is not possible. In this embodiment of the invention, software with a function for intermittently querying the control server 15 for a response and monitoring whether or not communication with the control server 15 is possible based on the result of the request is installed on the POS terminal 10. The control device-side browser execution unit 501 determines by a function of this software if communication with the control server 15 is possible. Note that any appropriate method may be used to determine if communication with the control server 15 is possible.

As shown in FIG. 6, the control device-side browser execution unit 501 and the control device-side application execution unit 5021 of the control device-side server software execution unit 502 of the POS terminal 10 start the transaction process when a transaction begins (step SE1 and step SF1).

Figure 7:
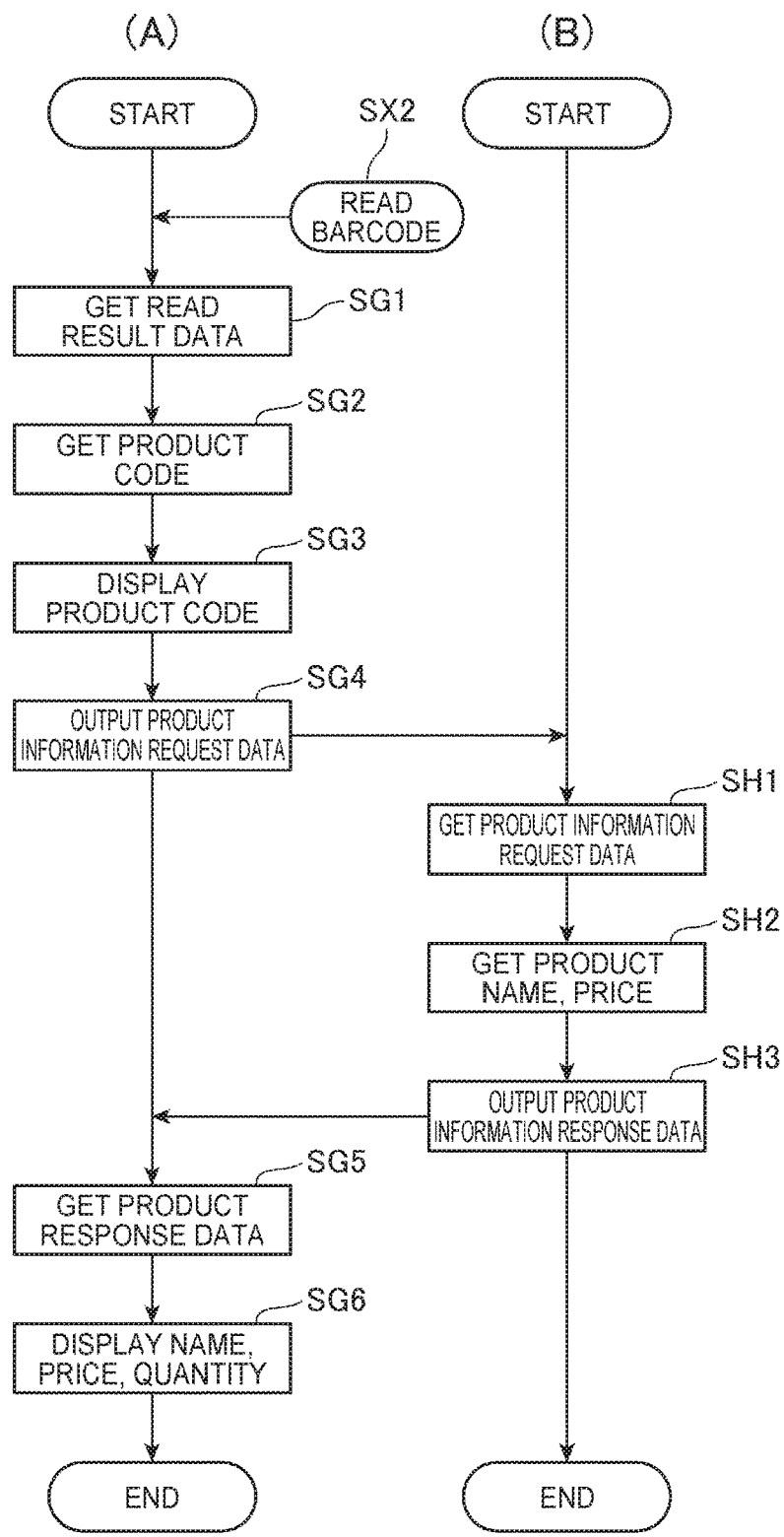
FIG. 7 is a flow chart of the operation of the control device-side browser execution unit 501 (column (A)) and the control device-side application execution unit 5021 (column (B)) of the POS terminal.

FIG. 7 is a flow chart showing part of the process executed by the control device-side browser execution unit 501 and the control device-side application execution unit 5021 of the POS terminal 10, column (A) showing the operation of the control device-side browser execution unit 501, and column (B) showing the operation of the control device-side application execution unit 5021.

When the transaction process starts, the checkout clerk reads the barcode from the product or the packaging of the product being purchased by the customer with the barcode scanner BS (step SX2). When a barcode is read, the barcode scanner BS outputs the read result data through the port to which the barcode scanner BS is connected to the control device-side device communication unit 54 of the POS terminal 10. The control device-side device communication unit 54 then outputs the read result data to the control device controller 50. As described above, the read result data is data containing information indicating the product code of the product.

As shown in the operation of the control device-side browser execution unit 501 in column (A) of FIG. 7, the control device-side browser execution unit 501 of the control device controller 50 of the POS terminal 10 acquires the read result data based on the input from the control device-side device communication unit 54 (step SG1).

Next, the control device-side browser execution unit 501 acquires the product code based on the read result data (step SG2).

Next, the control device-side browser execution unit 501 displays the product code acquired in step SG2 in the barcode information display area 63 of the user interface for processing transactions 60 (step SG3).

Next, the control device-side browser execution unit 501 controls the control device communication unit 53 to output product information request data querying the name and the price of the product identified by the product code acquired in step SG2 to the control device-side application execution unit 5021 (step SG4).

As shown in the operation of the control device-side application execution unit 5021 in column (B) of FIG. 7, the control device-side application execution unit 5021 of the POS terminal 10 acquires the product information request data input from the control device-side browser execution unit 501 (step SH1).

Next, the control device-side application execution unit 5021 acquires the product code based on the acquired product information request data, references the control device-side product master database 521 stored by the control device storage unit 52, and acquires the name and price of the product identified by the acquired product code (step SH2).

If the POS terminal 10 and control server 15 can communicate, the control device-side product master database 521 (control device-side data) is synchronized by a specific means with the server-side product master database 411 (server-side data) stored by the control server 15. An example of the means of synchronizing the control device-side product master database 521 and the server-side product master database 411 is described below.

More specifically, a special software application with a function for synchronizing the control device-side product master database 521 and server-side product master database 411 is installed on the POS terminal 10.

By reading and running this application, the control device controller 50 communicates with the control server 15 at specific times, such as when the POS terminal 10 turns on, and receives and stores a copy of the server-side product master database 411 as the control device-side product master database 521 in the control device storage unit 52. The control device controller 50 then intermittently queries the control server 15 for changes to the server-side product master database 411. If the server-side product master database 411 has not been updated between one query and the next, the server-side application execution unit 4011 of the control server 15 reports the same to the POS terminal 10 in response to the query. If the server-side product master database 411 has been updated between one query and the next, the server-side application execution unit 4011 sends to the POS terminal 10 a command to update the control device-side product master database 521 appropriately to the change to the server-side product master database 411. If such a control command was received from the control server 15 in response to the query, the control device controller 50 of the POS terminal 10 updates the control device-side product master database 521 based on the control command.

Note that the means of synchronizing the control device-side product master database 521 and the server-side product master database 411 is not limited to the foregoing. For example, instead of sending such a control command, the control server 15 may send a copy of the server-side product master database 411, or data describing the difference between the previous and current versions of the server-side product master database 411.

Further alternatively, instead of the POS terminal 10 querying the control server 15 for changes to the master database, the control server 15 may be configured to send the foregoing control command, or to send a copy of the server-side product master database 411, or data describing the difference between the previous and current versions of the server-side product master database 411, to the POS terminal 10 whenever the server-side product master database 411 is updated.

Next, the control device-side application execution unit 5021 outputs the product information response data denoting the product name and product price information acquired in step SH2 to the control device-side browser execution unit 501 (step SH3).

As shown in the operation of the control device-side browser execution unit 501 in column (A) of FIG. 7, the control device-side browser execution unit 501 of the POS terminal 10 acquires the product information response data input from the control device-side application execution unit 5021 (step SG5).

Next, the control device-side browser execution unit 501 acquires the product name and price data based on the received product information response data, and displays the combination of name, price, and quantity information for the product in the appropriate fields of the list display area 61 in the user interface for processing transactions 60 (step SG6).

In the operation of the control device-side browser execution unit 501 shown in column (A) of FIG. 6, the control device-side browser execution unit 501 of the POS terminal 10 acquires the foregoing transaction information when the transaction process ends (step SE2).

Next, the control device-side browser execution unit 501 stores the transaction information data representing the transaction information acquired in step SE2 in the control device storage unit (step SE3).

After the control device-side browser execution unit 501 can communicate again with the control server 15, the control device-side browser execution unit 501 sends the transaction information data stored in the control device storage unit 52 in step SE3 to the control server 15. After sending the transaction information data to the control server 15, the control device-side browser execution unit 501 deletes the transmitted transaction information data from the control device storage unit 52.

More specifically, when unable to communicate with the control server 15, the control device-side browser execution unit 501 monitors by a specific means if communication with the control server 15 has been enabled again. When communication with the control server 15 is re-enabled, the control device-side browser execution unit 501 reads the transaction information data records cumulatively stored to the control device storage unit 52 while unable to communicate with the control server 15 from the control device storage unit 52, and sends the transaction information data to the control server 15. Based on the transaction information data (if plural records of transaction information data were stored, receives the plural transaction information data records) received from the POS terminal 10, the server-side application execution unit 4011 of the control server 15 then creates a record in the transaction information management database 414 (if there were plural records of transaction information data, creates a record for each transaction information data record).

As described above, transaction information data based on transactions that are performed while the POS terminal 10 cannot communicate with the control server 15 is cumulatively stored in the POS terminal 10, and is sent to the control server 15 after communication with the control server 15 is enabled again. Based on the received transaction information data, the control server 15 updates the transaction information management database 414. As a result, even when the POS terminal 10 and control server 15 cannot communicate, a record corresponding to the transaction information data based on the performed transaction is created without fail in the transaction information management database 414 of the control server 15.

After storing the transaction information in step SE3, the control device-side browser execution unit 501 outputs the transaction information data to the control device-side application execution unit 5021 (step SE4).

As shown in the operation of the control device-side server software execution unit 502 in column (B) of FIG. 6, the control device-side application execution unit 5021 of the control device-side server software execution unit 502 of the POS terminal 10 then acquires the transaction information data input from the control device-side browser execution unit 501 (step SF2).

Next, the control device-side application execution unit 5021 generates recording data for producing a receipt based on the transaction information described by the transaction information data acquired in step SF2 (step SF3). This recording data is an XML document of information written in a specific XML format.

Next, the control device-side application execution unit 5021 outputs the generated recording data to the control device-side browser execution unit 501 (step SF4).

As shown in the operation of the control device-side browser execution unit 501 in column (A) of FIG. 6, the control device-side browser execution unit 501 of the POS terminal 10 acquires the recording data input from the control device-side application execution unit 5021 (step SE5).

Next, the control device-side browser execution unit 501 generates recording commands in a command language appropriate to the control device recording unit 51 based on the recording device data in the XML document (step SE6).

Next, the control device-side browser execution unit 501 controls the control device recording unit 51 to produce a receipt based on the generated recording commands (step SE7).

The receipt produced in step SE7 is then given by the checkout clerk to the customer.

As described above, when the POS terminal 10 cannot communicate with the control server 15, the POS terminal 10 processes transactions using the locally stored control device-side product master database 521 instead of using the server-side product master database 411 on the control server 15.

Problems such as described below may occur as a result of this process.

When the control server 15 and plural POS terminals 10 in a store system 11 having plural POS terminals 10 cannot communicate with each other due, for example, to a communication device 14 error or a global network GN error (due to network congestion, for example), each of the plural POS terminals 10 can continue processing transactions using the control device-side product master database 521 stored locally by each POS terminal 10.

The control device-side product master database 521 stored by each POS terminal 10 can also be independently updated and synchronized with the master database.

When communication with the control server 15 is possible, synchronizing with the server-side product master database 411 stored by the control server 15 is prioritized over updating the control device-side product master database 521 stored by one POS terminal 10. As a result, each POS terminal 10 is synchronized with the server-side product master database 411 of the control server 15 with priority over updating the control device-side product master database 521 stored by each POS terminal 10, and the content of the control device-side product master database 521 stored by each POS terminal 10 therefore remains the same.

When unable to communicate with the control server 15, the control device-side product master database 521 stored by the POS terminal 10 and the server-side product master database 411 stored by the control server 15 cannot be synchronized.

The content of the control device-side product master database 521 stored by each POS terminal 10 in a single store system 11 must be identical. That the plural control device-side product master databases 521 store identical content means that the product information related to any particular product code is the same in each database. This is because if the content of the control device-side product master database 521 is different on different POS terminals 10, problems such as customers paying a different amount for the same product at different checkout counters L may occur.

Therefore, when unable to communicate with the control server 15, the POS terminals 10 execute the following process when the control device-side product master database 521 is updated.

Figure 8:
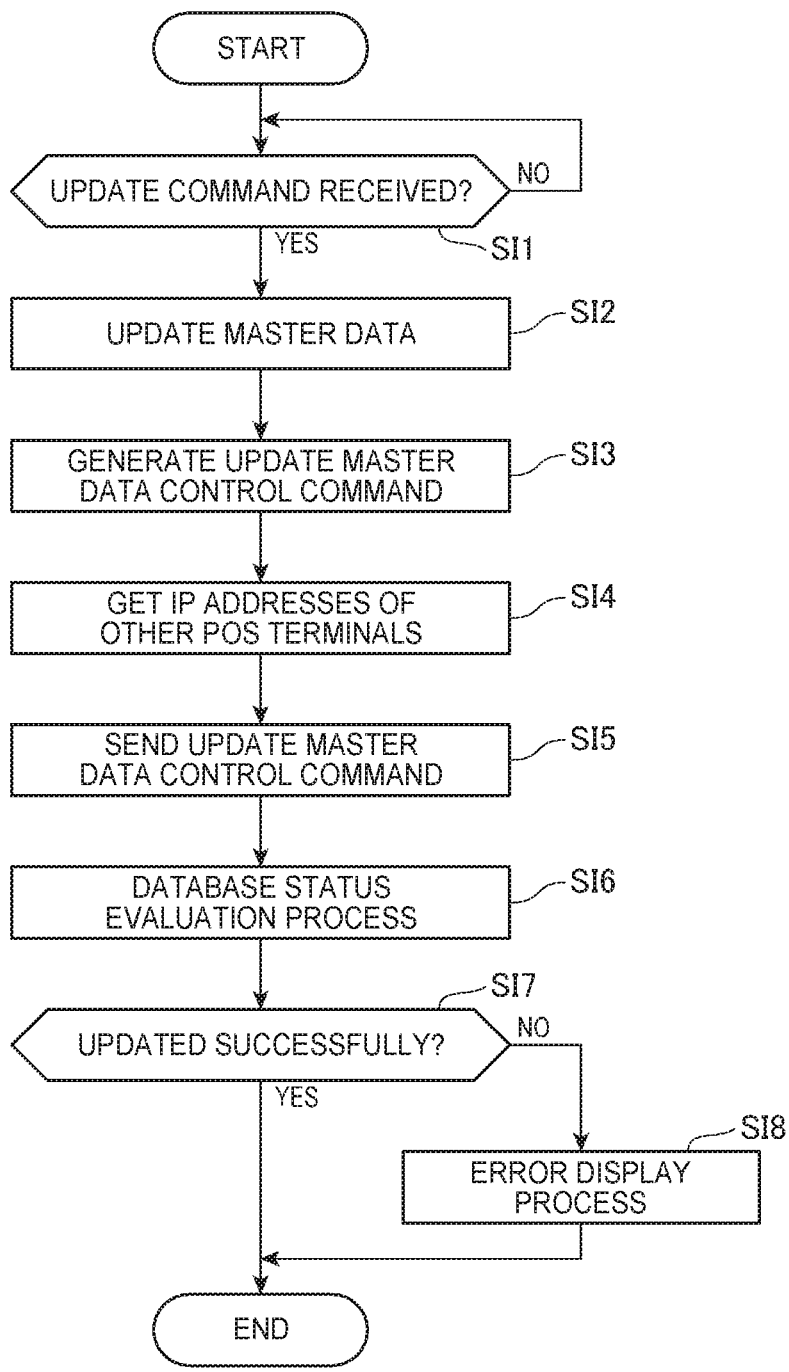
FIG. 8 is a flow chart of the operation of the POS terminal.

FIG. 8 is a flow chart showing the operation of the POS terminal 10 when unable to communicate with the control server 15.

When the operation of the flow chart in FIG. 8 starts, acquisition of the server-side HTML file 412 by the control device-side browser execution unit 501 of the POS terminal 10 is already completed. More specifically, the process of the flow chart in FIG. 8 anticipates that after acquisition of the server-side HTML file 412 by the control device-side browser execution unit 501 is completed, communication between the POS terminal 10 and control server 15 was interrupted for some reason.

The control device-side browser execution unit 501 determines if communication with the control server 15 is possible using a method such as described above, and if communication is not possible, executes the process shown in the flow chart in FIG. 8.

As shown in FIG. 8, the control device-side browser execution unit 501 of the control device controller 50 of the POS terminal 10 watches for a command to update the control device-side product master database 521 stored in the POS terminal 10 (step SI1).

The control device-side browser execution unit 501 has a function for displaying on the touch panel TP in response to a user command a user interface having an input field for information required to update the control device-side product master database 521, and a button for instructing updating the control device-side product master database 521 based on the input information.

When the information required to update the control device-side product master database 521 has been input, and the button instructing updating the master database is operated in step SI1, the control device-side browser execution unit 501 determines there was a command to update the master database.

Note that updating the control device-side product master database 521 includes, for example, changing information related to the product identified by the specific product code in the master database, adding a new record relationally storing a product code for a specific product and information related to that specific product in the master database, and deleting a record related to a specific product code from the master database.

When there is a command to update the control device-side product master database 521, the control device-side browser execution unit 501 updates the control device-side product master database 521 based on the input to the user interface s (step SI2).

Next, the control device-side browser execution unit 501 generates an update master data control command (step S13).

The update master data control command is a control command instructing another POS terminal 10 in the store system 11 (another POS terminal 10 connected to the local area network LN) to make the same change that was made to the control device-side product master database 521 in step SI2 to the control device-side product master database 521 stored by that other POS terminal 10.

Next, the control device-side browser execution unit 501 references the POS terminal master database 523 of the control device storage unit 52, and acquires the IP address of each other POS terminal 10 in the store system 11 (each other POS terminal 10 connected to the local area network LN) (step SI5).

The POS terminal master database 523 is a master data relationally managing for each other POS terminal 10 in the store system 11 (if there are plural other POS terminals 10, each of the plural other POS terminals 10) information (such as a serial number) identifying the other POS terminal 10 and the IP address of that other POS terminal 10. The POS terminal master database 523 is periodically updated by some specific means to maintain current information about each of the other POS terminals 10 connected to the local area network LN.

Next, the control device-side browser execution unit 501 transmits the update master data control command generated in step S13 to the IP address acquired in step SI4 (if plural IP addresses were acquired, to each of the plural IP addresses) (step SI5).

When an update master data control command is received, the POS terminal 10 executes the following process.

Specifically, the control device-side browser execution unit 501 of the POS terminal 10 executes a process of updating the control device-side product master database 521 stored by the control device storage unit 52 based on the received update master data control command. If the database is successfully updated, the control device-side browser execution unit 501 returns a control command (an update success command below) reporting that the update was completed successfully to the POS terminal 10 that sent the update master data control command. If updating the control device-side product master database 521 is completed normally, the content of the control device-side product master database 521 will be identical to the content of the control device-side product master database 521 of the POS terminal 10 that sent the update master data control command.

If updating the control device-side product master database 521 is not completed normally, the control device-side browser execution unit 501 returns a control command (an update failure command below) reporting that updating the control device-side product master database 521 failed to the POS terminal 10 that sent the update master data control command. If updating the control device-side product master database 521 fails, the content of the control device-side product master database 521 that was not successfully updated will be different from the content of the control device-side product master database 521 of the POS terminal 10 that sent the update master data control command.

After sending the update master data control command in step SI5, the control device-side browser execution unit 501 executes a database status evaluation process (step S16).

If the update success command was received, the control device-side browser execution unit 501 of the POS terminal 10 that sent the update master data control command determines in the database status evaluation process that the control device-side product master database 521 was updated successfully on the other POS terminal 10 that returned the update success command.

If the update failure command was received, the control device-side browser execution unit 501 of the POS terminal 10 that sent the update master data control command determines in the database status evaluation process that the control device-side product master database 521 was not updated on the other POS terminal 10 that returned the update failure command.

Also in the database status evaluation process, the control device-side browser execution unit 501 determines that the control device-side product master database 521 was not updated successfully on any other POS terminal 10 from which a control command, either an update success command or an update failure command, is not received within a specific time after broadcasting the update master data control command in step SI5. For example, if due to an error on the local area network LN another POS terminal 10 could not normally receive the update master data control command, that other POS terminal 10 will return an update success command or an update failure command. In addition, if a specific error that prevents responding to the update master data control command occurs on another POS terminal 10, that other POS terminal 10 cannot return an update success command or an update failure command.

Next, the control device-side browser execution unit 501, based on the result of the database status evaluation process in step S16, determines for all other POS terminals 10 to which the update master data control command was sent if updating the control device-side product master database 521 was completed (step SI7).

If the control device-side product master database 521 was successfully updated on all of the other POS terminals 10 to which the update master data control command was sent (step SI7: YES), the control device-side browser execution unit 501 ends the process If even one of the other POS terminals 10 to which the update master data control command was sent has not successfully updated the control device-side product master database 521 (step SI7: NO), the control device-side browser execution unit 501 executes an error display process (step SI8).

In the error display process, the control device-side browser execution unit 501 displays on the touch panel TP identification information identifying each of the other POS terminals 10 on which the control device-side product master database 521 was not successfully updated, and information indicating that the control device-side product master database 521 was not successfully updated on the POS terminals 10 for which identification information is displayed.

Figure 9:
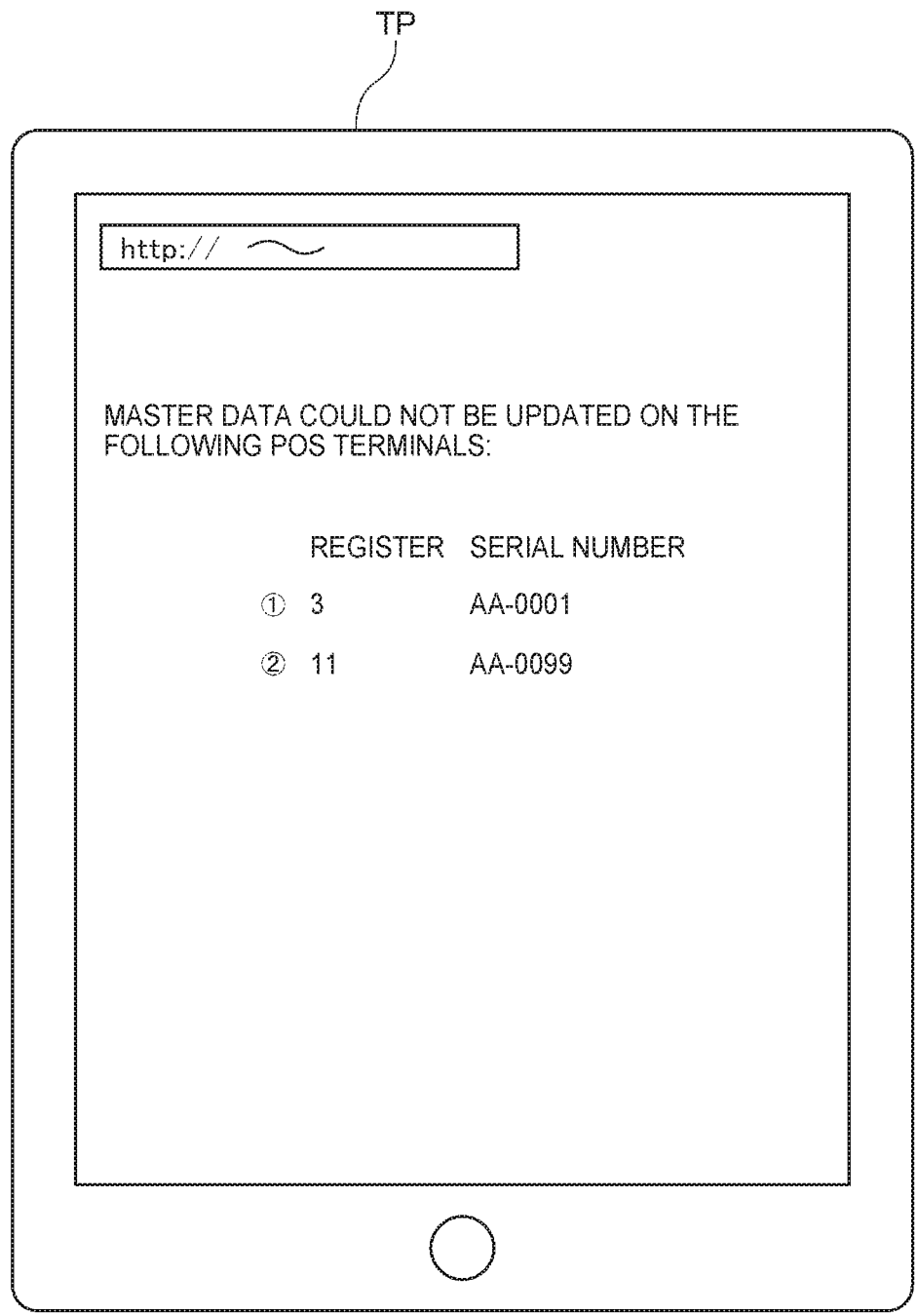
FIG. 9 shows an example of information displayed on the touch panel of the POS terminal.

FIG. 9 shows an example of content displayed on the touch panel TP in the error display process of step S18.

In the example shown in FIG. 9, the POS terminal 10 identification information includes the cash register number identifying the checkout counter L where the POS terminal 10 is located, and the serial number of the POS terminal 10. In this example, the identification information of each POS terminal 10 managed in the POS terminal master database 523 is a cash register number and serial number combination.

As shown in FIG. 9, identification information (cash register number and serial number combination) for each POS terminal 10 unable to successfully update the control device-side product master database 521, and information indicating that the control device-side product master database 521 was not successfully updated on the POS terminals 10 for which identification information is displayed, is displayed on the touch panel TP in the error display process.

By reading the information displayed on the touch panel TP in the error display process, the checkout clerk or other user can know on which POS terminals 10 the control device-side product master database 521 was not updated. This enables the user to take appropriate action, such as stopping transaction processes at the checkout counter L where a POS terminal 10 on which the control device-side product master database 521 was not updated is used, or updating the control device-side product master database 521 on that POS terminal 10 by appropriate means. As a result, transaction processes being executed using control device-side product master databases 521 of different content can be prevented.

As described above, a transaction processing system 1 (network system) according to this embodiment of the invention has a control server 15 (server) connected to a global network GN, and a plurality of POS terminals 10 (control device) that communicate with the control server 15 through the global network GN and communicate with each other over a local area network LN.

When able to communicate with the control server 15, the POS terminals 10 communicate over the global network GN with the control server 15, and execute transaction processes using the server-side product master database 411 (server-side data) stored on the control server 15. When unable to communicate with the control server 15, the POS terminals 10 execute transaction processes using a control device-side product master database 521 (control device-side data) that is synchronized with the server-side product master database 411 and stored locally by the POS terminal 10. When the plural POS terminals 10 cannot communicate with the control server 15, and the control device-side product master database 521 stored by at least one of the POS terminals 10 is updated, that one POS terminal 10 communicates with the plural other POS terminals 10 through the local area network LN and command the other POS terminals 10 to update the control device-side product master databases 521 stored by the individual POS terminals 10.

Thus comprised, when the POS terminals 10 are unable to communicate with the control server 15, and a change is made to the control device-side product master database 521 stored by at least one of the POS terminals 10, the control device-side product master databases 521 can be synchronized between each of the POS terminals 10 connected to the local area network LN. More specifically, a system having a control server 15 and a POS terminal 10 connected through a global network GN to the control server 15, and configured such that the POS terminal 10 executes processes using a master database stored on the control server 15, can desirably handle events when the POS terminals 10 cannot communicate with the control server 15.

In this example, the server-side product master database 411 and control device-side product master database 521 are master databases used in a transaction process. The POS terminal 10 executes the transaction process using either the server-side product master database 411 or the control device-side product master database 521.

Thus comprised, plural POS terminals 10 connected to a local area network LN can be prevented from executing different transaction processes using master databases with different content.

In this embodiment of the invention the POS terminal 10 has a recording function for recording transaction information on roll paper (recording media), and using the server-side product master database 411 or control device-side product master database 521 produces receipts recorded with transaction information.

Thus comprised, plural POS terminals 10 connected through a local area network LN can be prevented from producing receipts using master data with different content.

Furthermore, in this example, when one POS terminal 10 communicates with another POS terminal 10 through the local area network LN and instructs the other POS terminal 10 to update the control device-side product master database 521 stored by that other POS terminal 10, the one POS terminal 10 reports to the user when the control device-side product master database 521 on the other POS terminal 10 was not updated successfully.

Thus comprised, the POS terminals 10 that did not successfully update the control device-side product master database 521 can be known, and based on this knowledge a process that prevents executing a transaction process using the control device-side product master database 521 with different (old) content can be prevented.

Note that the user is informed by displaying information on the touch panel TP in the foregoing example, but information may be alternatively printed on roll paper, for example.

The invention is described above with reference to a preferred embodiment thereof, but the invention is not limited thereto and can be modified and adapted in many ways without departing from the scope of the accompanying claims.

For example, in the foregoing example, the control device-side browser execution unit 501 of the POS terminal 10 updates the control device-side product master database 521 on a different POS terminal 10 by sending an update master data control command to that other POS terminal 10. In this event, the POS terminal 10 may update the control device-side product master database 521 on the other POS terminal 10 by sending a copy of the updated control device-side product master database 521 to the other POS terminal 10. In this event, there is no need for a process of generating the update master data control command, and processing is efficient.

Further alternatively, the POS terminal 10 may update the control device-side product master database 521 on the other POS terminal 10 by sending difference data describing the differences between the previous, un-updated control device-side product master database 521 and the new, updated control device-side product master database 521. Thus comprised, because there is no need for a process of generating an update master data control command, and the transmitted data is difference data, the amount of data to transmit is small compared with transmitting a copy of the updated control device-side product master database 521, and communication efficiency is good.

For example, the POS terminal 10 in the foregoing embodiment has a recording function for recording on recording media, and the POS terminal 10 produces receipts based transaction processes. However, a configuration in which a recording device with a recording function is connected to the POS terminal 10, and receipts are produced by the recording device, is also conceivable.

In the foregoing example, the server-side data and control device-side data are product masters. However, the server-side data and control device-side data may be any data that requires synchronization, and must also be synchronized with the control device-side data stored by other POS terminals 10 connected to the local area network LN. For example, the control device-side data may be master data for a customer master database, or data for managing sales.

An example of the transaction processing system 1 according to the invention applied to a store system is described above, but the facilities in which the transaction processing system 1 is used are not limited to stores.

The devices of the transaction processing system 1 may also communicate using any desirable method.

In addition, the POS terminal 10 records by a thermal recording method in the foregoing example, but the recording method is not so limited.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system comprising:
a processor of a server configured to connect to a global network; and
a plurality of processors of control devices configured to communicate through the global network with the server and with each other through a local area network, each control device including control device-side data that is stored locally by each of the plurality of processors and is synchronized with server side data,
wherein each of said plurality of processors of the control devices,
when able to communicate with the processor of the server, communicates with the processor of the server through the global network and executes a specific process using the server-side data stored by the processor of the server,
when unable to communicate with the processor of the server, executes the specific process using the control device-side data and thereafter updating the control device-side data,
when the control device-side data stored by at least one processor of said plurality of processors is updated while unable to communicate with the processor of the server, that one control device communicates with processors of the other control devices through the local area network, and causes a CPU of each of the other control devices to update the control device-side data stored by the processor of that other control device while a processor of the one control device is unable to communicate with the processor of the server, wherein the one control device receives an indication from the processors of each of the other control devices that the update of the control device-side data was successful, if it is determined that at least one of the processors of each of the other control devices did not successfully update the control device-side data, the one control device reports an identification of the unsuccessful device; and
when able to communicate with the processor of the server, the CPU of the one control device is configured to prioritize synchronization with the server-side data stored by the processor of the server over updating the control device-side data stored by the processor of the other control device.

2. The network system described in claim 1, wherein:
the server-side data and control device-side data are master data used in a transaction process; and the processors of the control devices use the server-side data or the control device-side data to execute the transaction process.

3. The network system described in claim 2, wherein:
the processors of the control devices have a recording function to record transaction information on a recording medium, and record the transaction information using the server-side data or the control device-side data.

4. The network system described in claim 2, further comprising:
a printer configured to record transaction information on a recording medium;
wherein the processors of the control devices can connect to the printer, and cause the printer to record the transaction information using the server-side data or the control device-side data.

5. A method for controlling a network system, the network system including a processor of a server configured to connect to a global network, and
a plurality of processors of control devices configured to communicate through the global network with the server and with each other through a local area network,
the method comprising steps of the processors of the control devices: when able to communicate with the processor of the server, communicating with the processor of the server through the global network and executing a specific process using server-side data stored by the processor of the server;
when unable to communicate with the processor of the server, executing the specific process using control device-side data that is stored locally by the processor of the control device and is synchronized with the server-side data and thereafter updating the control device-side data;
when the control device-side data stored by at least one of the processors of the control device is updated while unable to communicate with the processor of the server, that processor of the one control device communicates with the processor of the other control devices through the local area network, and causes each processor of the other control device to update the control device-side data stored by that processor of the other control device; wherein the processor of the one control device receives an indication from the processors of each of the other control devices that the update of the control device-side data was successful;
if it is determined that at least one of the processors of each of the other control devices did not successfully update the control device-side data, the processor of the one control device reports an identification of the unsuccessful device; and
when able to communicate with the processor of the server, the processor of the control device is configured to prioritize synchronization with the server-side data stored by the processor of the server over updating the control device-side data stored by the processor of the other control device.

6. The method for controlling a network system as described in claim 5, wherein:
the server-side data and control device-side data are master data used in a transaction process; and the processors of the control devices use the server-side data or the control device-side data to execute the transaction process.

7. The method for controlling a network system as described in claim 6, wherein:
the processor of the control device has a recording function to record transaction information on a recording medium, and records the transaction information using the server-side data or the control device-side data.

8. The method for controlling a network system as described in claim 6, wherein:
the processor of the control device can connect to a printer configured to record transaction information on a recording medium, and causes the printer to record the transaction information using the server-side data or the control device-side data.

9. A processor of a control device comprising:
a peripheral circuit configured to communicate with a processor of a server through a global network and with a processor of another control device through a local area network, and
communicate with the processor of the server through the global network to receive control device-side data synchronized with server-side data stored by the processor of the server;
a memory configured to store the received control device-side data; and
a processor configured to communicate by the peripheral circuit with the processor of the server through the global network and execute a specific process using the server-side data when able to communicate with the processor of the server,
execute the specific process using control device-side data that is stored in the memory when unable to communicate with the processor of the server and thereafter update the control device-side data stored in the memory, and
when the control device-side data stored by the memory is updated while unable to communicate with the processor of the server, communicate by the peripheral circuit with another processor of the control device through the local area network, and cause the processor of the other control device to update the control device-side data stored by the processor of the other control device, wherein an indication is received from the processor of the other control device that the update of the control device-side data was successful;
if it is determined that the processor of the other control device did not successfully update the control device-side data, report an identification of the unsuccessful device; and
when able to communicate with the processor of the server, prioritize synchronization with the server-side data stored by the processor of the server over updating the control device-side data stored by the processor of the other control device.

10. The control device described in claim 9, wherein:
the server-side data and control device-side data are master data used in a transaction process; and the processor uses the server-side data or the control device-side data to execute a transaction process.

11. The control device described in claim 10, wherein:
the processor has a recording function to record transaction information on a recording medium, and records the transaction information using the server-side data or the control device-side data.

12. The control device described in claim 10, wherein:
the peripheral circuit connects to a printer configured to record transaction information on a recording medium; and
the processor can send the transaction information using the server-side data or the control device-side data from the peripheral circuit to the printer for recording.

* * * * *